United States Patent [19]
Laugesen

[11] Patent Number: 6,098,858
[45] Date of Patent: Aug. 8, 2000

[54] HOLDER FOR RECEIVING AN OBJECT PROVIDED WITH A BUTTON

[76] Inventor: Lise-Lotte Laugesen, Strudsbergvej 38, Slagelse, DK-4200, Denmark

[21] Appl. No.: 08/833,398

[22] Filed: Apr. 8, 1997

[30] Foreign Application Priority Data

Apr. 12, 1996 [DK] Denmark .............................. 96 00128

[51] Int. Cl.⁷ ...................................................... A45F 5/00
[52] U.S. Cl. ............................ 224/197; 24/597; 224/242; 224/271
[58] Field of Search .................................... 224/197, 271, 224/272, 242; 24/597

[56] References Cited

U.S. PATENT DOCUMENTS

| | | | |
|---|---|---|---|
| 5,201,858 | 4/1993 | Otrusina | 24/597 |
| 5,597,102 | 1/1997 | Saarikko et al. | 224/197 |
| 5,622,296 | 4/1997 | Pirhonen et al. | 224/197 |
| 5,779,115 | 7/1998 | Parkas et al. | 224/272 |
| 5,850,996 | 12/1998 | Liang | 224/197 |
| 5,927,580 | 7/1999 | Ward-Llewellyn | 224/272 |

FOREIGN PATENT DOCUMENTS 95 00375 12/1996 Denmark .

*Primary Examiner*—Stephen P. Garbe
*Attorney, Agent, or Firm*—Merchant & Gould P.C.

[57] ABSTRACT

The invention relates to a holder (1) for receiving an object (8) provided with a button (7), such as a cellular telephone. The holder (1) is provided with a receiving passage (5) for receiving the button (7), a resilient stop (10) for securing the button (7) in the receiving passage (5) when the object (8) provided with a button (7) is arranged in the holder, and a device for releasing the resilient stop (10), comprising a push button (12) located opposite the opening of the receiving passage. The holder (1) is characterized in that the releasable stop (10) and the push button (12) is one integral unit (13) which is pivotally arranged about an axis of rotation in the holder, wherein at least one resilient element is provided for countering rotation of the integral unit (13). Moreover the push button (12) is so arranged relative to the axis of rotation, that the resilient stop (10) may be released by pushing the push button (12).

6 Claims, 1 Drawing Sheet

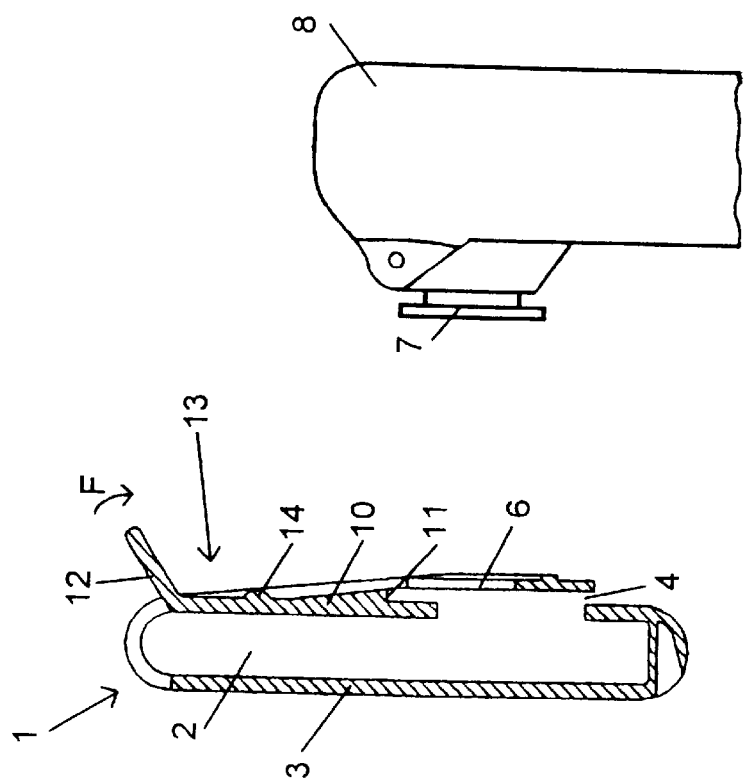
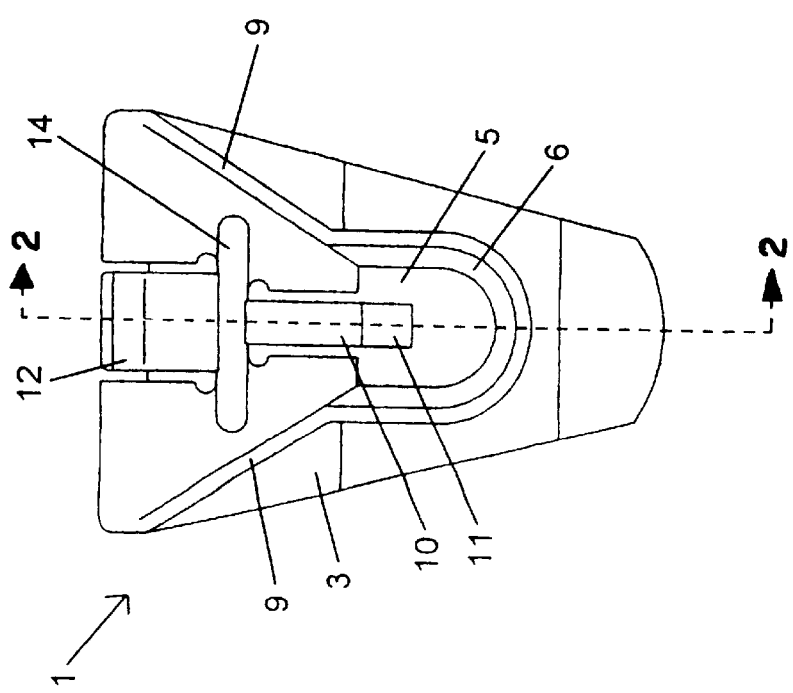

HOLDER FOR RECEIVING AN OBJECT PROVIDED WITH A BUTTON

FIELD OF THE INVENTION

The present invention relates to a holder for receiving an object provided with a button, such as a cellular telephone, said holder comprising a receiving passage for receiving the button, a resilient stop for securing the button in the receiving passage when the object provided with a button is arranged in the holder, and a device for releasing the resilient stop comprising a push button located opposite the opening of the receiving passage.

BACKGROUND OF THE INVENTION

Holders of this type are known e.g. for securing cellular telephones, pagers, etc., and are available in various configurations.

Thus, Danish utility model No. 9500375 teaches a holder of the type described in the introductory part that consists of a unit moulded in a plastics material arranged with a through-going passage for being received on a strap or the like. This holder may secure an object provided with a button, such as a cellular telephone, since the button may be inserted into a receiving passage arranged at the front of the holder and secured therein by a resilient stop.

The release of the resilient stop is brought about by pushing two push buttons arranged on the sides and which exert a pushing influence via inclined surfaces onto other inclined surfaces integral with the resilient stop whereby the resilient stop is forced backwards. The object provided with a button may subsequently be discharged from the receiving passage.

More over a device is known having a corresponding push device for releasing the resilient stop, wherein the push button is arranged above the opening of the receiving passage. In this prior art device the resilient stop is made of spring steel while the remaining part of the holder consists of several plastics components which are subsequently assembled. The mechanism for transmitting the movement of the push button to allow the resilient stop to release the button on the relevant object comprises i.e. a separate spring.

The known holders for receiving an object provided with a button are comparatively complex to manufacture since they comprise closed passages for receiving push buttons which presupposes complex and thus expensive tools. Moreover the known holders are ass-ambled from a multitude of individual components which also contributes to making the manufacturing process more complex and expensive, and increases the risk of malfunctions in the end product.

BRIEF SUMMARY OF THE INVENTION

It is an object of the present invention to provide a holder for securing an object provided with a button, which holder does not suffer from the drawbacks associated with known holders.

This is obtained with a holder of the kind described in the introductory part which is characterized in that the resilient stop and the push button are in the form of one integral unit which is pivotally arranged about an axis of rotation in the holder, wherein at least one resilient element is provided for countering rotation of the integral unit, an that the push button is so arranged relative to the axis of rotation that the resilient stop may be released by pushing the push button.

Such arrangement of the holder allows for a simple and reliable construction which may be manufactured with more unsophisticated tools than the known holders.

Moreover the holder according to the invention is assembled from very few components, and by allowing the resilient element to consist of a torsionally resilient element between the integral unit 3 and the remaining part of the holder 1 a particularly simple spring construction is obtained.

The torsionally resilient element may consist of an integral torsion element whereby this element integal unit 13 resilient stop/push button and the remaining part of the holder may be manufactured in one piece with ensuing considerable savings in manufacturing costs.

When the push button protrude above the opening of the receiving passage as featured in claim 4, the resilient stop may be released by a substantially downward push with e.g. one's thumb, which is an ergonomically natural movement when the object provided with a button is to be removed from the holder.

The holder may have a passage for receiving a strap whereby the holder may be strapped or belted. Thus it is possible for a person to carry the holder in his belt which is particularly convenient if the holder is used to carry a cellular telephone or a pager.

When the passage is slotted, the holder may be arranged on the belt without initial loosening thereof. This solution is of particular interest for instance if the holder is to be fitted and taken off several times a day.

BRIEF DESCRIPTION OF THE DRAWINGS

The invention will now be described in further detail with reference to a preferred embodiment shown in the drawings, wherein FIG. 1 is a front view of a holder in accordance with the invention, FIG. 2 is a sectional view of the holder shown in FIG. 1 along the line A—A, and FIG. 3 illustrates the upper end of an object on which a button is mounted to be received in the holder shown in FIGS. 1 and 2.

DETAILED DESCRIPTION

FIGS. 1 and 2 illustrate a preferred embodiment of a holder 1 according to the invention. The holder consists of an injection-moulded plastics unit which, in the embodiment shown, is injection-moulded in one step, i.e. the entire holder 1 is in one piece.

The holder 1 is provided with a passage 2 for receiving a not shown strap, the passage 2 being delimited by the outer wall 3 of the holder. In the embodiment shown the one wall of the holder 1 is slotted so as to form a gap 4 to be used when the holder is to he fitted with a strap, as will become apparent below.

Moreover the holder 1 is provided with a receiving passage 5 delimited by a rounded wall 6. The receiving passage 5 is adapted for receiving a button 7, cf. FIG. 3, located on the object 8 desired to be contained in the holder 1. Above the receiving passage 5, inclined guide surfaces 9 are arranged which may be of assistance when the button 7 on the object 8 is to be inserted into the receiving passage 5.

Behind the receiving passage 5 a resilient stop 10 is provided which has a retaining edge 11 arranged for retaining the button 7 when arranged at the bottom of the receiving passage 5. The resilient stop 10 in combination with a push button 12 that protrudes above the opening of the receiving passage 5 constitute an integral unit 13. In the embodiment shown the integral unit 13 consists of the resilient stop 10 and the push button 12 moulded integrally with the remaining part of the holder 1 via a transition piece 14 that acts as a torsion spring during use of the holder 1.

The use of the container 1 will be subject to more detailed description in the following, reference still being made to the preferred embodiment shown in FIGS. 1 through 3.

A strap, e.g. a belt, is mounted on the holder 1 by conveying the holder 1 downwards behind the belt, while simultaneously opening the gap 4 to such an extent that the belt is permitted to pass through the gap 4 and into the passage 2. The holder 1 is to be so arranged that the receiving passage 5 faces away from the person wearing the holder 1.

The object 8 to be received in the holder 1 may typically be a cellular telephone or a pager, but other objects may also be relevant. For the sake of clarity, however, the object 8 will be designated the cellular telephone 8 in the following. The button 7 may be mounted on the cellular telephone 8 in a variety of ways which is of no consequence for the present invention. Thus, the button 7 may be attached to the cellular telephone 8 by gluing or any other type of attachment or it may be integral with the back of the cellular telephone 8.

When it is desired to arrange the cellular telephone 8 in the holder 1, the button 7 is inserted into the receiving passage 5 until it reaches the bottom thereof. While the button 7 is inserted into the receiving passage 5, the resilient stop 10 is resiliently pushed backwards due to the thickened portion thereof which leads to the retaining edge 11. At the moment when the button 7 has been inserted so far that it has passed the retaining edge 11, which happens shortly before the button 7 reaches the bottom of the receiving passage 5, the resilient stop 10 flexes back to its starting position shown in FIG. 2. In this position the retaining edge 11 retains the button 7 and thereby prevents unintentional falling out or removal of the cellular telephone 8 from the holder 1. The return of the resilient stop 10 to its starting position when the button 7 has passed the retaining edge 11 takes place with an audible click which is a signal to the user that the cellular telephone 8 is correctly positioned in the holder 1.

When the cellular telephone 8 is to be removed from the holder 1 the push button 12 is pushed down which means that the integral portion 13 consisting of the resilient stop 10 and the push button 12 as a whole will pivot in the direction of the arrow F in FIG. 2, the integral part 13 and the remaining part of the holder 1 being connected only via an integrally moulded torsion element 14 with a comparatively small cross section. Owing to the resistance of the torsion element 14 against twisting, the pivoting of the integral portion 13 will be very restricted but extensive enough for the retaining edge 11 to be pivoted so far back that the cellular telephone 8 with the button 7 is freely removable from the holder 1.

The embodiment shown in FIGS. 1 and 2 is particularly advantageous from an ergonomical point of view since downwards pushing of the push button 12 with e.g. one's thumb may be a completely natural movement while simultaneously lifting the cellular telephone 8 with the remaining part of one's hand for removal from the holder 1.

Since the downwardly oriented push exerted on the push button 12 also effects advancement thereof due to the pivoting in the direction of the arrow F, it is also possible to dimension the push button 12 to completely prevent unintentional release of the resilient stop 10 when the cellular telephone 8 is in its usual holding position. This may be obtained e.g. by arranging the button 7 at such distance from the top of the cellular telephone which exceeds the distance from the bottom of the receiving passage 5 to the top of the push button 12. Hereby the cellular telephone 8 will, in its usual holding position, extend beyond the push button 12, and if the push button 12 simultaneously extends forwards for abutment on the back of the cellular telephone 8, release of the resilient stop 10 is completely prevented for as long as the cellular telephone 8 is in this usual holding position. In order to release the resilient stop 10, it is necessary to carry out a pivoting of the cellular telephone 8 to the horizontal position about the button 7 whereby free access to the push button 12 is obtained.

In the embodiment shown the torsion element 14 is shown as being moulded integrally with the remaining part of the holder 1. However, this need not be the case since other alternatives for the spring mechanism are perceivable without departing from the idea of the invention. Thus the torsion element 14 may consist of a separate torsion element that connects the integral portion 13 with the remaining part of the holder 1 and which is not mounted until after injection moulding of the two portions which in combination constitute the holder 1 in this embodiment.

The torsion element 14 may also be replaced by a freely pivotable connection between the integral portion 13 and the remaining part of the holder 1 whereby the flexing properties of the resilient stop 10 may be obtained e.g. by means of thin flaps originating in the holder 1 for loose abutment on the back of the resilient stop 10.

It is also possible for the holder 1 to be configured for arrangement not only on a strap, e.g. for mounting on a wall, or as a clip for fitting on the waistband or the shirt pocket. Moreover the holder may be made of other materials than plastics.

What is claimed is:

1. A holder (1) for receiving an object (8) provided with a button (7) such as a cellular telephone, said holder (1) comprising a receiving passage (5) for receiving the button (7), the receiving passage having an opening, a resilient stop (10) for securing the button (7) in the receiving passage (5) when the object (8) provided with a button (7) is arranged in the holder (1), and a device for releasing the resilient stop (10) comprising a push button (12) arranged opposite the opening of the receiving passage, characterized in that the resilient stop (10) and the push button (12) is one integral unit (13) arranged to be pivotal about an axis of rotation in the holder, wherein at least one resilient element is provided for countering rotation of the integral unit (13), and that the push button (12) is so arranged relative to the axis of rotation that the resilient stop (10) may be released by pushing the push button (12).

2. A holder according to claim 1, characterized in that the resilient element consists of a torsionally resilient element between the integral unit (13) and the remaining part of the holder (1).

3. A holder according to claim 2, characterized in that the torsionally resilient element consists of a integral torsion element (14), the integral torsion element (14), the integral unit (13) and the remaining part of the holder (1) being in one piece.

4. A holder according to claim 1, characterized in that the push button (12) protrudes above the opening of the receiving passage (5), and that the release of the resilient stop (10) is effected by pushing the push button substantially downwards.

5. A holder according to claim 1, characterized in that the holder (1) as a whole is provided with a passage (2) for receiving e.g. a strap.

6. A holder according to claim 5, characterized in that the front wall of the passage (2) is slotted for providing a gap (4) through which the strap may be conveyed during fitting of the holder (1) onto the strap.

* * * * *